(12) United States Patent
Garner et al.

(10) Patent No.: US 11,326,455 B2
(45) Date of Patent: May 10, 2022

(54) 3D-PRINTED COMPOSITE COMPRESSOR BLADE HAVING STRESS-ORIENTED FIBER AND METHOD OF MANUFACTURING THE SAME

(71) Applicant: DOOSAN HEAVY INDUSTRIES & CONSTRUCTION CO., LTD., Changwon-si (KR)

(72) Inventors: Chad Garner, Jupiter, FL (US); Andres Jaramillo, Jupiter, FL (US)

(*) Notice: Subject to any disclaimer, the term of this patent is extended or adjusted under 35 U.S.C. 154(b) by 158 days.

(21) Appl. No.: 16/503,563

(22) Filed: Jul. 4, 2019

(65) Prior Publication Data
US 2021/0003014 A1  Jan. 7, 2021

(51) Int. Cl.
| | |
|---|---|
| *F01D 5/14* | (2006.01) |
| *B33Y 10/00* | (2015.01) |
| *B33Y 80/00* | (2015.01) |
| *F04D 29/32* | (2006.01) |
| *F01D 5/28* | (2006.01) |

(Continued)

(52) U.S. Cl.
CPC ............ *F01D 5/147* (2013.01); *B29C 64/118* (2017.08); *B29C 64/165* (2017.08); *B33Y 10/00* (2014.12); *B33Y 70/00* (2014.12); *B33Y 80/00* (2014.12); *B29K 2077/00* (2013.01); *B29K 2307/04* (2013.01); *B29L 2031/08* (2013.01);

(Continued)

(58) Field of Classification Search
CPC . F01D 5/147; F01D 5/282; F01D 5/14; F01D 25/005; B33Y 10/00; B33Y 70/00; B33Y 80/00; B29C 64/118; B29C 64/165; B29K 2077/00; B29K 2307/04; B29L 2031/08; F05D 2220/32; F05D 2230/30; F05D 2230/31; F05D 2300/603; F05D 2300/6034; F05D 2300/614; F05D 2300/702; F04D 29/324; F04D 29/388
See application file for complete search history.

(56) References Cited

U.S. PATENT DOCUMENTS

| | | | | |
|---|---|---|---|---|
| 3,532,438 | A * | 10/1970 | Palfreyman ............ | B29D 22/00 416/213 R |
| 7,828,526 | B2 * | 11/2010 | Cairo .................... | F04D 29/322 416/224 |

(Continued)

FOREIGN PATENT DOCUMENTS

JP       2009516798 A       4/2009

*Primary Examiner* — Eric J Zamora Alvarez
(74) *Attorney, Agent, or Firm* — Harvest IP Law, LLP

(57) ABSTRACT

A compressor blade of a gas turbine includes a compressor blade portion including a plurality of layers; and a carbon fiber reinforcement embedded in the plurality of layers of the compressor blade portion and oriented in a direction of stress fields of the compressor blade when in operation. A method of manufacturing the compressor blade includes preparing a composite material including fiber-reinforced layers; forming a first layer of the composite material to extend in a radial direction of the compressor blade; and stacking a second layer of the composite material on the first layer in an axial direction of the compressor blade. The compressor blade is 3D-printed by forming each composite material layer in a radial direction, which layers are stacked in an axial direction. Fiber reinforcement in the composite compressor blade is oriented in line with the stress fields inherent in the operation of the compressor blade.

5 Claims, 7 Drawing Sheets

(51) Int. Cl.
    *B29C 70/30*     (2006.01)
    *B29C 64/165*     (2017.01)
    *B29C 64/118*     (2017.01)
    *B33Y 70/00*     (2020.01)
    B29L 31/08     (2006.01)
    B29K 77/00     (2006.01)
    B29K 307/04     (2006.01)

(52) U.S. Cl.
    CPC ...... *F05D 2220/32* (2013.01); *F05D 2230/31* (2013.01); *F05D 2300/603* (2013.01)

(56) References Cited

U.S. PATENT DOCUMENTS

| | | | |
|---|---|---|---|
| 2005/0084379 A1* | 4/2005 | Schreiber | F04D 29/34 416/230 |
| 2015/0337670 A1* | 11/2015 | Merriman | F01D 5/288 416/241 R |
| 2016/0169044 A1* | 6/2016 | Clarkson | F01D 21/045 415/196 |
| 2017/0292530 A1* | 10/2017 | Pope | F01D 5/282 |

\* cited by examiner

3D-PRINTED COMPOSITE COMPRESSOR BLADE HAVING STRESS-ORIENTED FIBER AND METHOD OF MANUFACTURING THE SAME

BACKGROUND OF THE DISCLOSURE

Field of the Disclosure

Exemplary embodiments of the present disclosure relate to a 3D-printed composite compressor blade, and more particularly, to a 3D printing method of a composite fiber additive-manufacturing (CFAM) compressor blade including fiber reinforced layers according to a stacking direction of the composite compressor blade in the 3D printing process.

Description of the Related Art

Generally, gas turbines include a compressor, a combustor, and a turbine. The compressor draws external air, compresses the air, and then transmits it to the combustor. Air compressed by the compressor enters a high-pressure and high-temperature state. The combustor mixes fuel with compressed air supplied from the compressor, and combusts the mixture. Combustion gas generated by the combustion is discharged to the turbine. Turbine blades provided in the turbine are rotated by the combustion gas, whereby power is generated. Generated power may be used for generating electricity, driving a mechanical device, etc.

Larger gas turbines include correspondingly large compressor sections, which are comprised of multiple stages. The farthest upstream (front) stage of a gas turbine compressor includes the largest compressor blades.

In a contemporary method of manufacturing the compressor blade, the compressor blade is typically made of a steel alloy. As the engine sizes become larger, the attachment stress of the compressor blade drives the allowable overall size of the compress blade. In an effort to manage the stress, blade chord length may be reduced and blade height may be limited. However, compressor efficiency is compromised by the blade chord length reduction and height limitation, which is particularly a problem with the manufacture of the front compressor blades.

In addition to reducing blade size, another effort to manage blade attachment stress includes reducing the mass of the compressor blade. Additive manufacturing technology such as a 3D printing method can be used to reduce the mass of the compressor blade. However, a contemporary 3D printing method produces a compressor blade having weak strength in a radial direction because each layer of a blade made by 3D printing is stacked along the radial direction.

An improved compressor blade and a compressor blade manufacturing method of the same are needed by which large compressor blades are possible while maintaining compressor efficiency. That is, it is desirable to devise a compressor blade manufacturing method that enables attachment of compressor blades having reduced mass without blade chord length reduction or height limitation.

SUMMARY OF THE DISCLOSURE

An object of the present disclosure is to provide a CFAM compressor blade formed by 3D printing layers that are bonded to each other in a direction perpendicular to a radial direction of the blade.

It in another object of the present disclosure is to provide a method of manufacturing the CFAM compressor blade suitable for a front stage compressor blade to be 3D printed with carbon fiber.

It is another object of the present disclosure to provide a 3D printed compressor blade with carbon fiber reinforcement oriented in the direction of the highest stresses of the blade in operation.

Other objects and advantages of the present disclosure can be understood by the following description, and become apparent with reference to the embodiments of the present disclosure. Also, it will be clear to those skilled in the art to which the present disclosure pertains that the objects and advantages of the present disclosure can be realized by the means as claimed and combinations thereof.

In accordance with one aspect of the present disclosure, there is provided a compressor blade of a gas turbine. The compressor blade may include a compressor blade portion including a plurality of layers; and a carbon fiber reinforcement embedded in the plurality of layers of the compressor blade portion and oriented in a direction of stress fields of the compressor blade when in operation.

The compressor blade may further include a blade base portion disposed between the compressor blade portion and a rotor disk of the gas turbine, wherein the blade base portion does not include the carbon fiber reinforcement.

The compressor blade may further include a blade tip portion disposed between the compressor blade portion and a compressor casing of the gas turbine, wherein the blade tip portion does not include the carbon fiber reinforcement.

The plurality of layers may include sequentially stacked layers extending between a trailing edge of the compressor blade and a leading edge of the compressor blade.

The plurality of layers of the compressor blade portion may extend a radial direction of the compressor blade and may be stacked in an axial direction perpendicular to the radial direction.

According to another aspect of the present disclosure, there is provided a method of manufacturing a compressor blade. The method may include preparing a composite material including fiber-reinforced layers; forming a first layer of the composite material to extend in a radial direction of the compressor blade; and stacking a second layer of the composite material on the first layer in an axial direction of the compressor blade.

The method may further include adjusting a build direction of the first and second layers in order to orient the fiber-reinforced layers according to stress fields of the compressor blade when in operation.

The first layer of the composite material may be formed at one of a trailing edge and a leading edge of the compressor blade, and the stacking may be repeated until reaching the other of the trailing edge and the leading edge of the compressor blade.

The compressor blade may include a compressor blade portion and a blade tip portion, and the method may further include forming the blade tip portion after the reaching the other of the trailing edge and the leading edge of the compressor blade. In addition or in the alternative, the compressor blade may include a compressor blade portion and a blade base portion, in which case the method may further include forming the blade base portion before forming the first layer.

According to another aspect of the present disclosure, a gas turbine may include a compressor to compress air introduced from an outside, the compressor including a compressor blade; a combustor to produce combustion gas by combusting a mixture of fuel and the compressed air; and a turbine to produce power using the combustion gas. Here, the compressor blade may be consistent with the above-described compressor blade.

The advantageous feature of the present invention is that the composite compressor blade is made by a 3D printing process, in which each composite material layer, including a fiber reinforced layer, is formed in a radial direction and stacked along an axial direction, thereby allowing the fiber reinforcement in the composite compressor blade to be oriented in line with the stress fields inherent in the operation of the compressor blade. Therefore, the composite compressor blade made by the present invention can reduce the weight and stressing of the blade and provide for the manufacture of larger blades.

Furthermore, the method of the present disclosure is capable of 3D printing the blade for cost reduction and for significant weight reduction so that attachment stress may be reduced. Here, the weight reduction achieved is an approximately 80% reduction. Due to the dramatic reduction in mass, even larger blades can be designed.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE EMBODIMENTS

Figure 1:
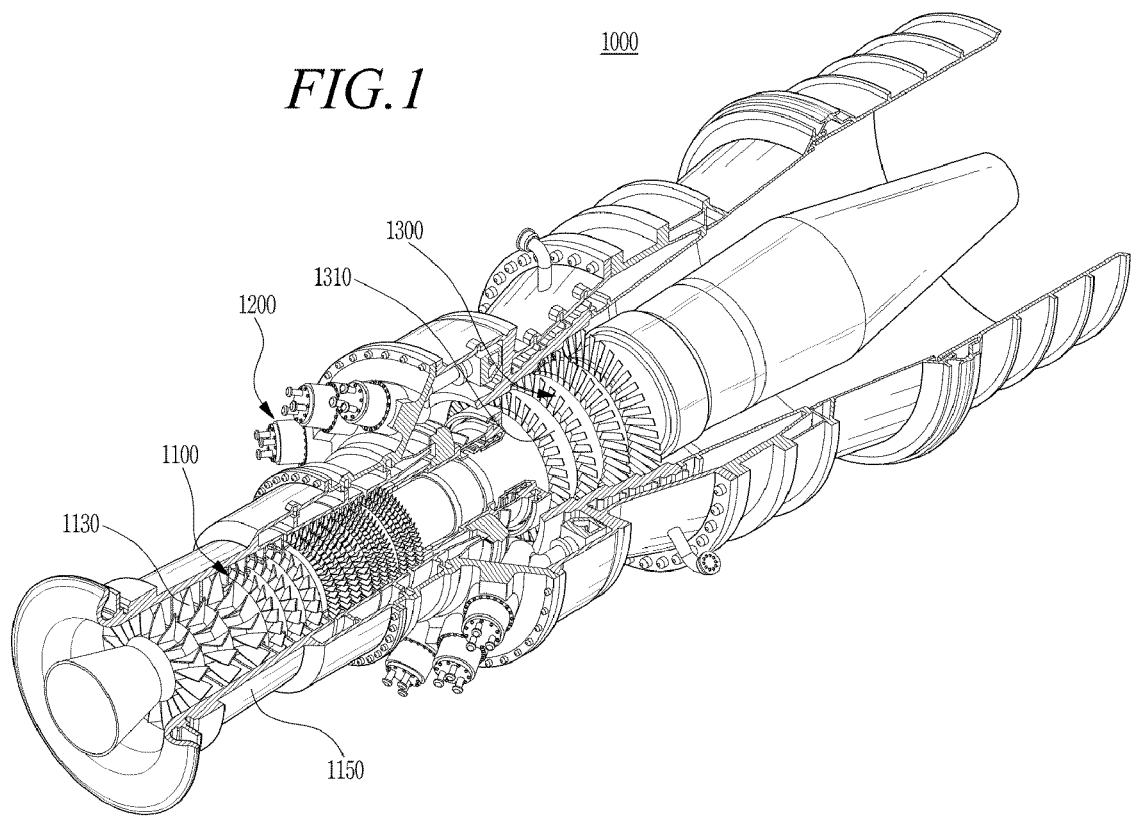
FIG. 1 is a cutaway perspective view of a gas turbine in which may be applied a compressor blade in accordance with the present disclosure.

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise," "include," "have," etc. when used in this specification, specify the presence of stated features, integers, steps, operations, elements, components, and/or combinations of them but do not preclude the presence or addition of one or more other features, integers, steps, operations, elements, components, and/or combinations.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements may be exaggerated, omitted, or depicted schematically.

Figure 2:
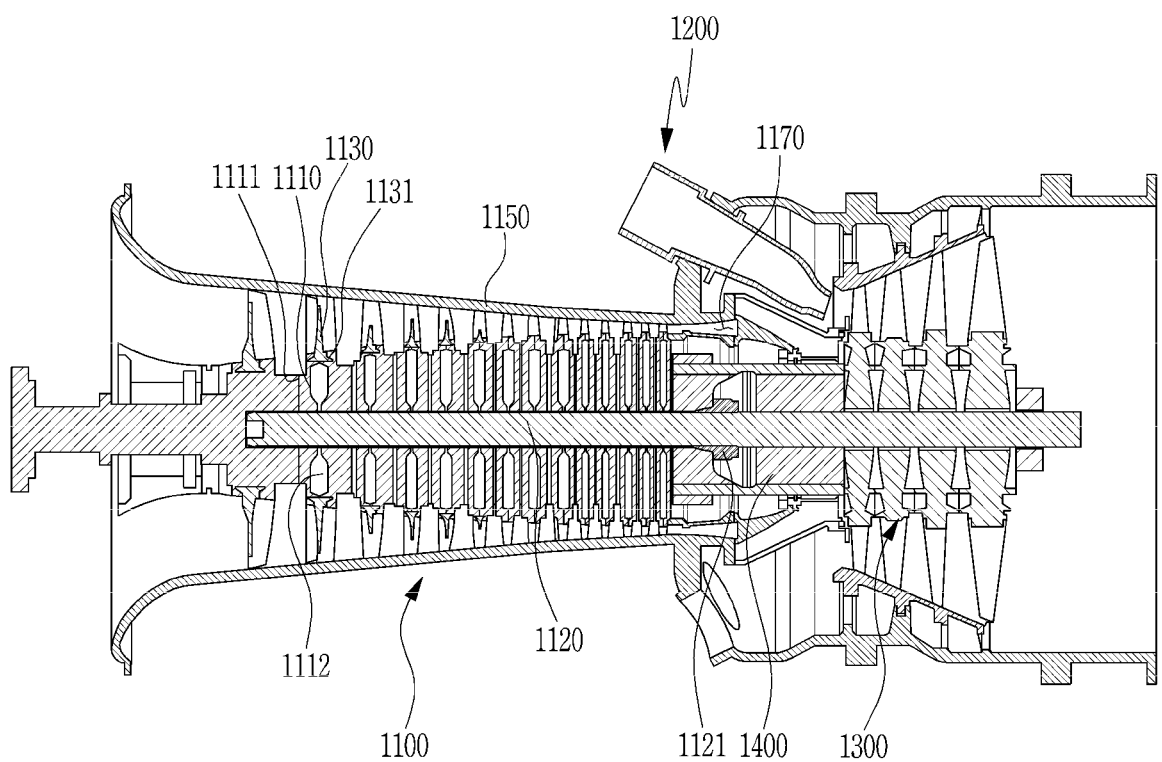
FIG. 2 is a cross section of the gas turbine of FIG. 1.
Figure 3:
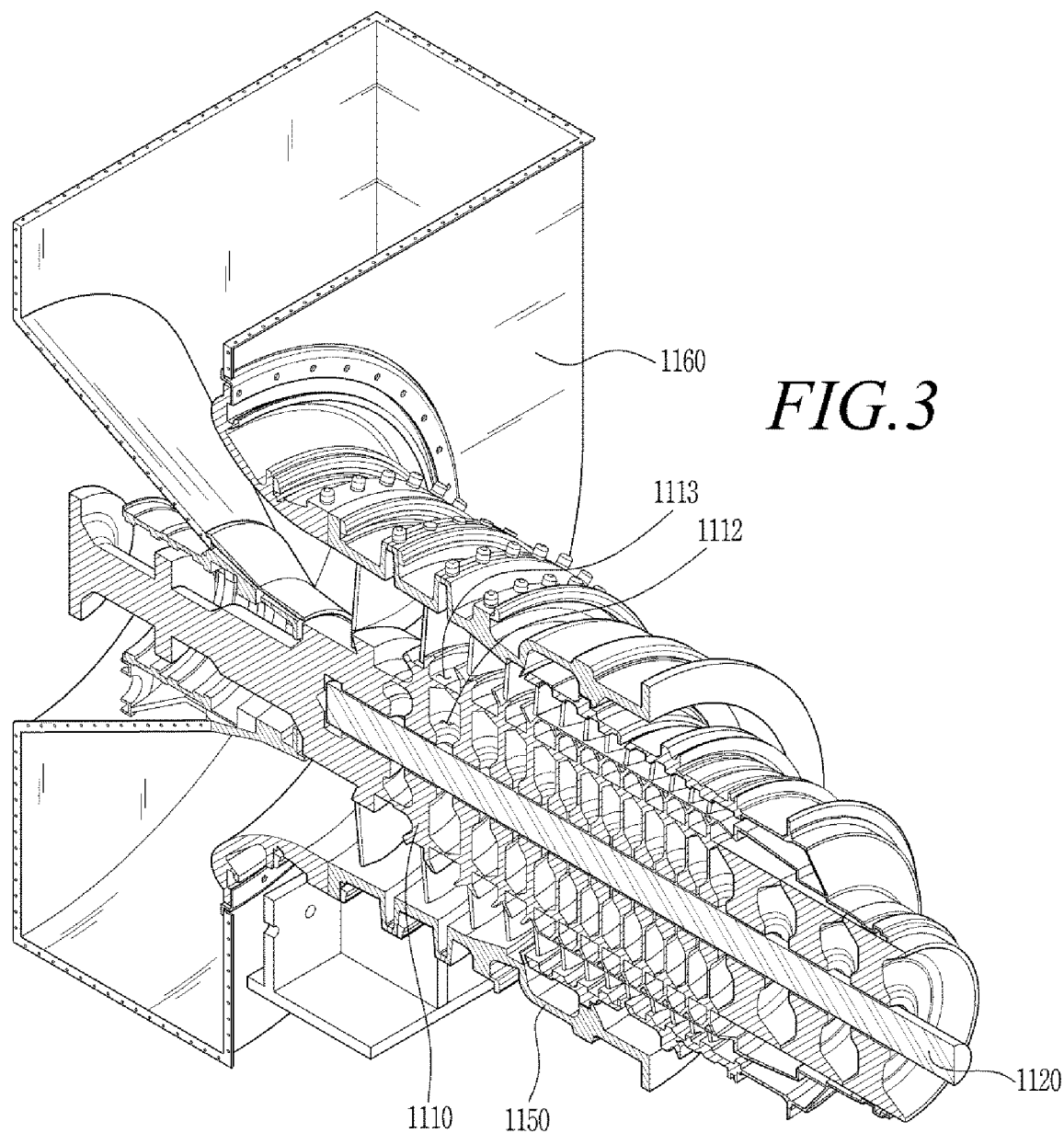
FIG. 3 is a cutaway perspective view of the compressor of the gas turbine of FIG. 1.

FIGS. 1 and 2 illustrate an internal structure of a gas turbine 1000 in accordance with an embodiment of the present disclosure, and FIG. 3 shows the compressor 1100 of the gas turbine.

As illustrated in FIGS. 1 to 3, the gas turbine 1000 may include a compressor 1100, a combustor 1200, and a turbine 1300. The compressor 1100 may draw external air, and compress the air. The combustor 1200 may mix fuel with the air compressed by the compressor 1100, and combust the mixture. The turbine 1300 includes a plurality of turbine blades 1310, which are installed so as to be rotatable by combustion gas discharged from the combustor 1200. Hereinafter, the compressor 1100, which is a critical part of the present disclosure, will be described in detail, and detailed descriptions of the combustor 1200 and the turbine 1300 will be omitted.

The compressor 1100 among critical components of the gas turbine 1000 includes a plurality of rotor disks 1110, a center tie rod 1120, a plurality of blades 1130, a compressor casing 1150, an intake 1160, and a diffuser 1170.

The blades 1130 are mounted to each of the rotor disks 1110. The center tie rod 1120 is provided to pass through the rotor disk 1110. Each rotor disk 1110 may be rotated by rotation of the center tie rod 1120, thus rotating the blades 1130. The rotor disks 1110 may comprise fourteen such rotor disks arranged in a multistage structure.

The plurality of rotor disks 1110 are coupled by the center tie rod 1120 such that the rotor disks 1110 are not spaced apart from each other in an axial direction. The respective rotor disks 1110 through which the center tie rod 1120 passes are arranged along the axial direction. A plurality of protrusions (not illustrated) may be provided on an outer circumferential portion of each of the rotor disks 1110, and a flange 1111 may be provided on the outer circumferential portion so that the flange 1111 can be coupled with an adjacent rotor disk 1110 to allow the rotor disks 1110 to rotate together.

An air flow passage 1112 may be formed in any one or more of the plurality of rotor disks 1110. Air compressed by the blade 1130 of the compressor 1100 may move to the turbine 1300 through the air flow passage 1112, thus cooling the turbine blade 1310.

The center tie rod 1120 is disposed to pass through the rotor disks 1110 to align the rotor disks 1110. The center tie rod 1120 may receive torque generated from the turbine 1300 and rotate the rotor disk 1110. To this end, a torque tube 1400 functioning as a torque transmission member to transmit rotating torque generated from the turbine 1300 to the compressor 1100 may be disposed between the compressor 1100 and the turbine 1300.

One end of the center tie rod 1120 is coupled to the farthest upstream rotor disk, and the other end is inserted into and coupled to the torque tube 1400 using a compression nut 1121. The compression nut 1121 compresses the torque tube 1400 toward the rotor disks 1110 so that the respective rotor disks 1110 tightly contact each other.

The plurality of blades 1130 are radially coupled to an outer circumferential surface of each of the rotor disks 1110. Each blade 1130 may include a root member 1131 through which the blade 1130 is coupled to the rotor disk 1110. The rotor disk 1110 may include a slot 1113 into which the root member 1131 is inserted. In the present embodiment, the blades 1130 are coupled to the rotor disks 1110 in a slot manner, but the present disclosure is not limited to this coupling method. That is, various methods may be used to couple the blade 1130 and the rotor disk 1110.

The blades 1130 are rotated by the rotation of the rotor disk 1110 to compress drawn air and to move the compressed air to a subsequent stage. Air is compressed gradually to higher and higher pressures while passing through the blades 1130 successively forming the multi-stage structure.

The compressor casing 1150 forms the outer appearance of the compressor 1100 and houses the rotor disks 1110, the center tie rod 1120, the blades 1130, and so forth. The compressor casing 1150 may have a connection tube through which air compressed in a multi-stage manner by the multi-stage compressor blades 1130 flows to the turbine 1300 to cool the turbine blades.

The intake 1160 is disposed at an inlet of the compressor 1100. The intake 1160 draws external air into the compressor 1100. The diffuser 1170 for diffusing and moving compressed air is disposed on an outlet of the compressor 1100. The diffuser 1170 may rectify air compressed by the compressor 1100 before the compressed air is supplied to the combustor 1200, and may convert a portion of kinetic energy of the compressed air into static pressure energy. The compressed air that has passed through the diffuser 1170 is drawn into the combustor 1200.

Figure 4A:
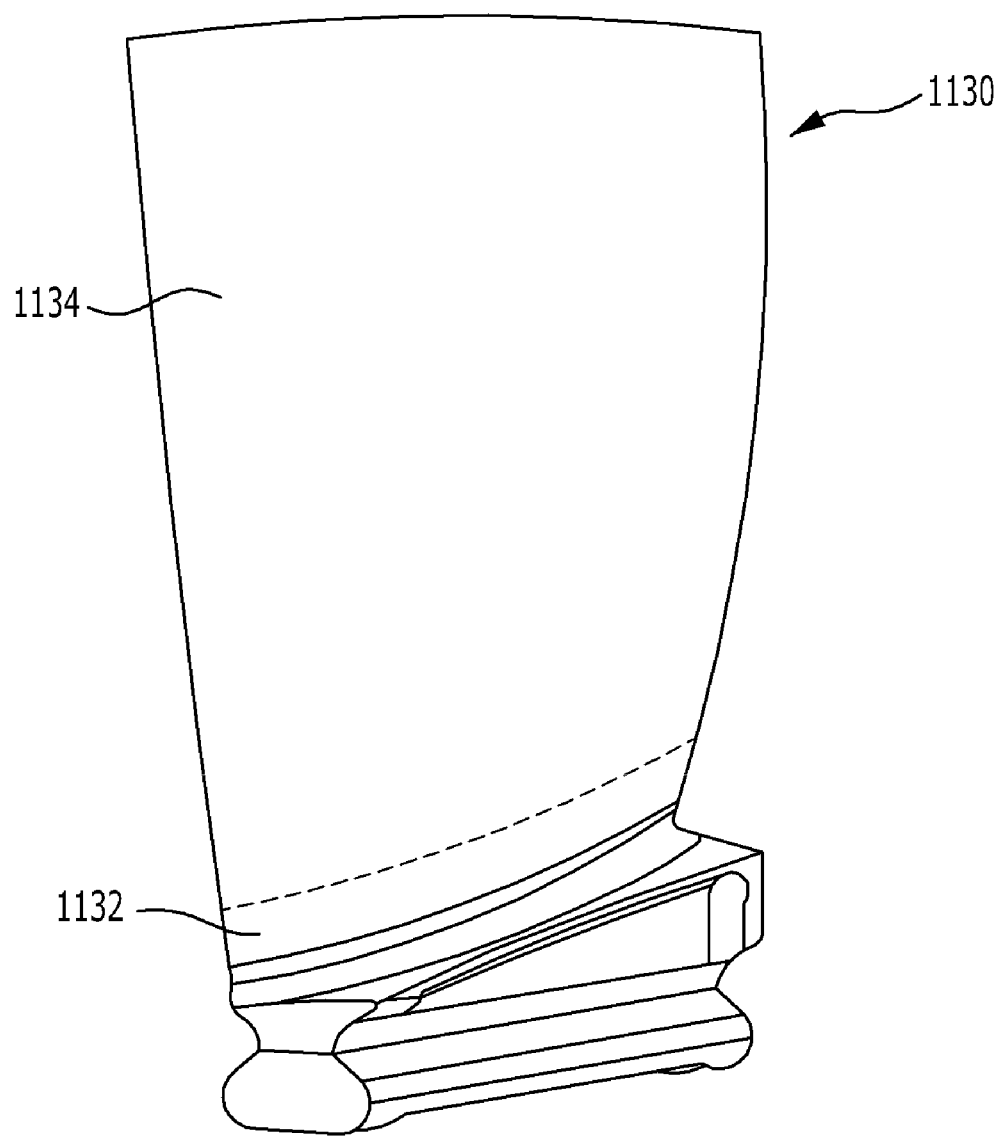
FIGS. 4A and 4B are perspective views of a compressor blade according to the present disclosure in which a blade base portion or a blade tip portion is included with a compressor blade portion.
Figure 4B:
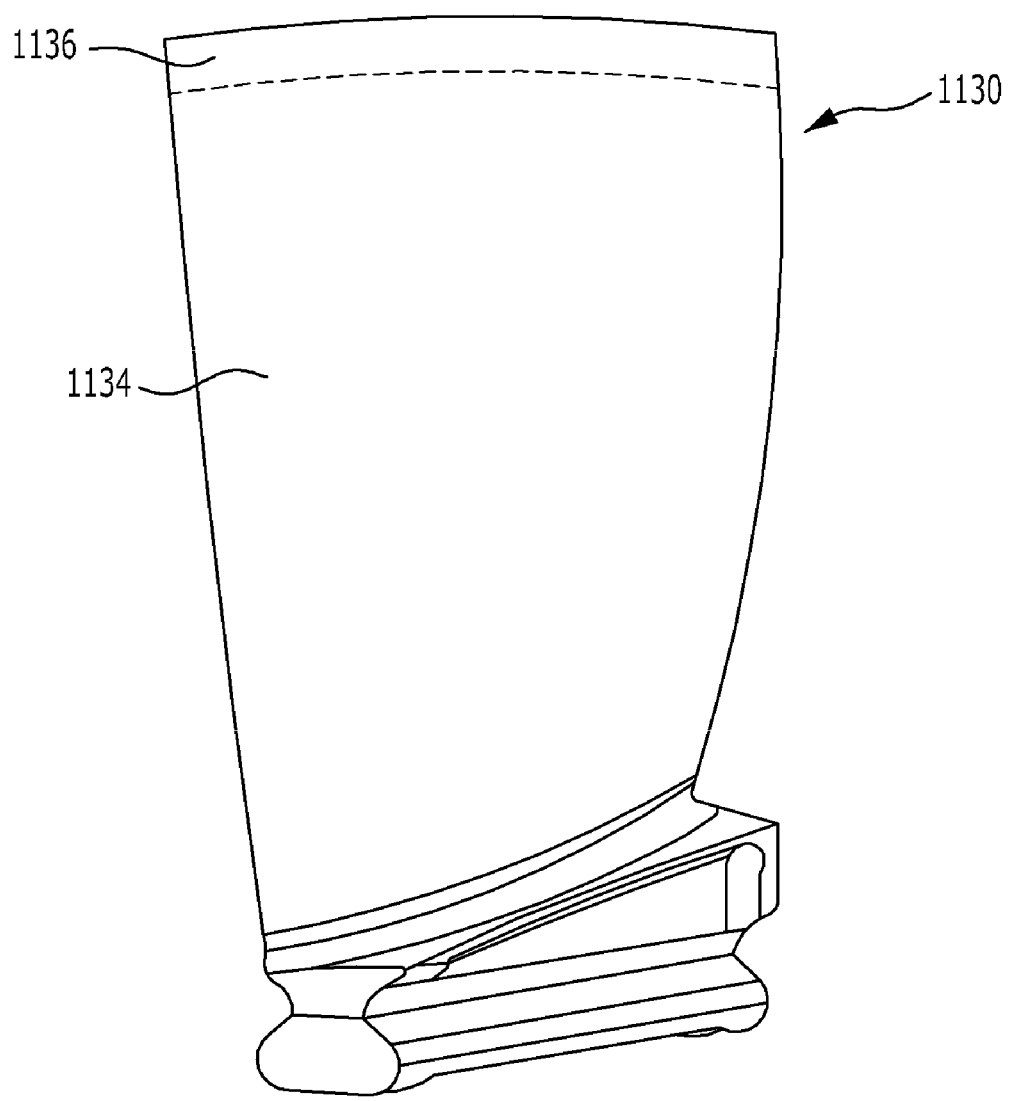

FIGS. 4A and 4B respectively illustrate embodiments of a compressor blade 1130 according to the present disclosure. The compressor blade 1130 of the present disclosure may include a blade base portion 1132 and a compressor blade portion 1134 as shown in FIG. 4A, the compressor blade portion 1134 and a blade tip portion 1136 as shown in FIG. 4B, or a combination of these. The present disclosure is not limited to these configurations, such that the compressor blade 1130 may comprise a compressor blade portion 1134 that includes both the compressor blade tip and the compressor blade base.

The blade base portion 1132, which may be formed conventionally, may be disposed between the compressor blade portion 1134 and the rotor disk 1110. The blade tip portion 1136, which may be formed conventionally, may be disposed between the compressor blade portion 1134 and the compressor casing 1150. According to the present disclosure, the blade base portion 1132 and the compressor blade t portion 1136 are components of the compressor blade 1130 that may not be 3D-printed. The blade base portion 1132 and the compressor blade t portion 1136 do not include the carbon fiber reinforcement 1133 (described later).

Figure 5:
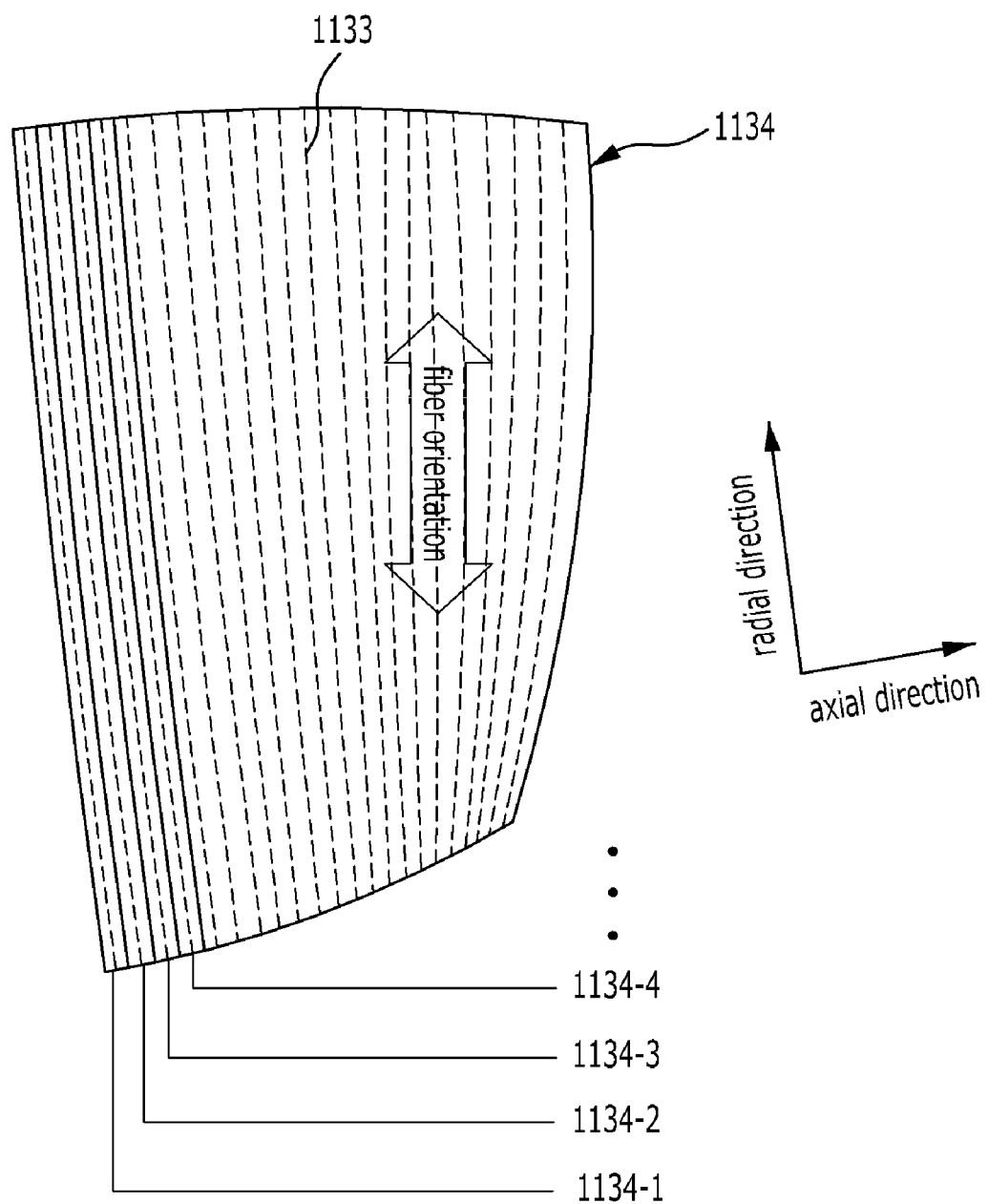
FIG. 5 is a schematic diagram of a compressor blade portion of a compressor blade according to the present disclosure in which 3D-printed layers of the compressor blade are stacked in the axial direction.

FIG. 5 illustrates the compressor blade 1130 including the compressor blade portion 1134 in which a plurality of 3D-printed layers are stacked in an axial direction of the blade. The axial direction of the compressor blade 1130 may correspond generally with the axial direction of the compressor 1100. The radial direction of the compressor blade 1130 is equivalent to a Y-axis and is perpendicular to the axial direction as an X-axis.

Referring to FIG. 5, the compressor blade 1130 is made using additive manufacturing (3D printing) technology, which includes the ability to lay down fiber reinforced layers imbedded in nylon using fused deposition modeling (FDM). Thus, the compressor blade 1130 includes carbon fibers oriented in the direction of the stress fields of the blade, and preferably in the radial direction of the blade. In particular, the compressor blade 1130 includes carbon fiber reinforcement 1133 in the form of oriented carbon fibers which are embedded in the compressor blade portion 1134.

Additive manufacturing (AM) describes the technologies that build three-dimensional (3D) objects by adding layer-upon-layer of material, which material may include the nylon including carbon fibers. The material may be a composition of a liquid, powder, or sheet material.

Common to AM technologies is the use of a computer, 3D modeling software (such as computer-aided design or CAD), machining equipment, and a layering material, i.e., the metal. A CAD sketch is made of the compressor blade 1130 including the compressor blade portion 1134 and is stored in a CAD file. The AM equipment reads in data from the CAD file and lays downs, or adds, successive layers of the metal material in a layer-upon-layer fashion to fabricate the compressor blade portion 1134 as a 3D object. The added layers may include layers 1134-1, 1134-2, 1134-3, 1134-4 . . . , and the sequence of layers may begin at the trailing edge of the compressor blade 1130 and may continue until reaching the leading edge of the compressor blade 1130. The present disclosure is not limited to this succession of layers, and the method of the present disclosure may include a layering that begins at the leading edge of the compressor blade 1130 and continues until reaching the trailing edge of the compressor blade 1130.

The additive manufacturing process of the present disclosure may include any of 3D printing, rapid prototyping (RP), direct digital manufacturing (DDM), layered manufacturing, and additive fabrication.

Due to the nature of FDM-type 3D printing, the carbon fibers can only be laid down in two dimensions, that is, to extend in two directions, but cannot be laid down in a third direction (Z axis). As shown in FIG. 5, the carbon fibers are oriented so as to coincide with the radial direction, while the layers 1134-1 through 1134-4 are stacked in the axial direction. Accordingly, the compressor blade manufacturing method the present disclosure orients the build direction such that the fiber reinforcement is oriented in line with the stress fields inherent in the operation of the compressor blade 1130.

Figure 6:
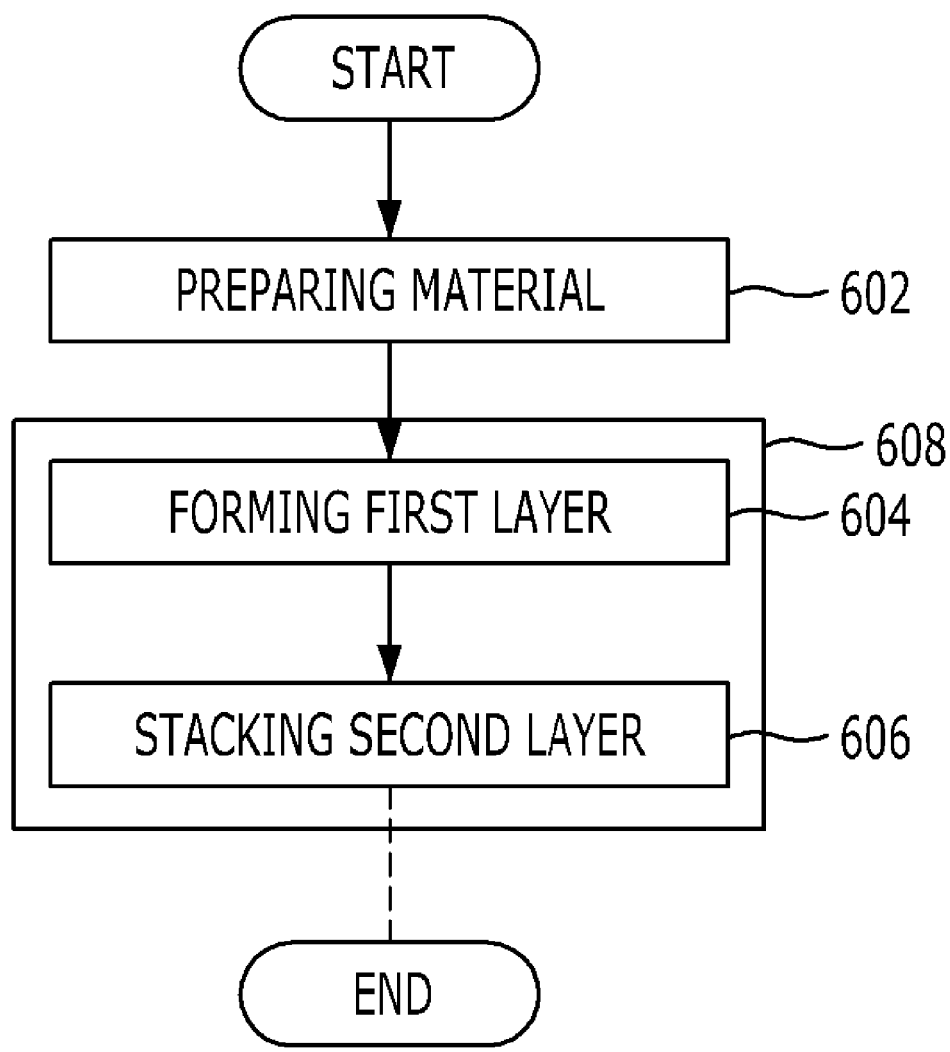
FIG. 6 is a flowchart of a method of manufacturing a composite compressor blade according to the embodiment of the present disclosure.

FIG. 6 illustrates a method of manufacturing the compressor blade 1130 according to an embodiment of the present disclosure. The method includes the steps of preparing a composite material including fiber-reinforced layers (602); forming a first layer of the composite material to extend in a radial direction of the compressor blade (604); and stacking a second layer of the composite material on the first layer in an axial direction of the compressor blade (606).

According to the above method, the forming of the first layer (e.g., layer 1134-1) and the stacking of the second layer (e.g., layer 1134-2) are each achieved by adjusting a build direction of the first and second layers in order to orient the fiber-reinforced layers according to stress fields of the compressor blade when in operation (608). The stacking process is repeated until the compressor blade portion 1134 is completed.

According to the method of FIG. 6, the compressor blade 1130 includes the compressor blade portion 1134 and at least one of the blade base portion 1132 and the blade tip portion 1136. Thus, the method may further include a step of forming the blade base portion 1132 before forming the first layer 1134-1. The method may further include a step of forming the blade tip portion 1136 after stacking the last layer.

According to the above disclosure, the CFAM compressor blade of the present disclosure includes fiber reinforced layers according to a stacking direction of a composite compressor blade in a 3D printing process. Thus, the X-Y carbon fibers are oriented in a 3D-printed compressor blade in line with the stress fields inherent in the blade's operation.

While the present disclosure has been described with respect to the specific embodiments, it will be apparent to those skilled in the art that various changes and modifications may be made without departing from the scope of the disclosure as defined in the following claims.

What is claimed is:

1. A compressor blade of a gas turbine, comprising:
   a compressor blade portion including a plurality of layers;
   a carbon fiber reinforcement embedded in the plurality of layers of the compressor blade portion and oriented in a direction of stress fields of the compressor blade when in operation, the carbon fiber reinforcement being oriented and embedded in a radial direction,
   wherein the plurality of layers include 3D-printed layers stacked in an axial direction of the compressor blade perpendicular to the radial direction; and
   a blade base portion disposed between the compressor blade portion and a rotor disk of the gas turbine, wherein the blade base portion does not include the carbon fiber reinforcement.

2. The compressor blade of claim 1, further comprising:
   a blade tip portion disposed between the compressor blade portion and a compressor casing of the gas turbine, wherein the blade tip portion does not include the carbon fiber reinforcement.

3. The compressor blade of claim 1, wherein the plurality of layers includes sequentially stacked layers extending between a trailing edge of the compressor blade and a leading edge of the compressor blade.

4. The compressor blade of claim 1, wherein the plurality of layers of the compressor blade portion extend in the radial direction of the compressor blade and are stacked in the axial direction perpendicular to the radial direction.

5. A gas turbine comprising a compressor to compress air introduced from an outside, the compressor including a compressor blade; a combustor to produce combustion gas by combusting a mixture of fuel and the compressed air; and a turbine to produce power using the combustion gas, wherein the compressor blade comprises:
   a compressor blade portion including a plurality of layers;
   a carbon fiber reinforcement embedded in the plurality of layers of the compressor blade portion and oriented in a direction of stress fields of the compressor blade when in operation, the carbon fiber reinforcement being oriented and embedded in a radial direction,
   wherein the plurality of layers include 3D-printed layers stacked in an axial direction of the compressor blade perpendicular to the radial direction; and
   a blade base portion disposed between the compressor blade portion and a rotor disk of the gas turbine, wherein the blade base portion does not include the carbon fiber reinforcement.

\* \* \* \* \*